UNITED STATES PATENT OFFICE.

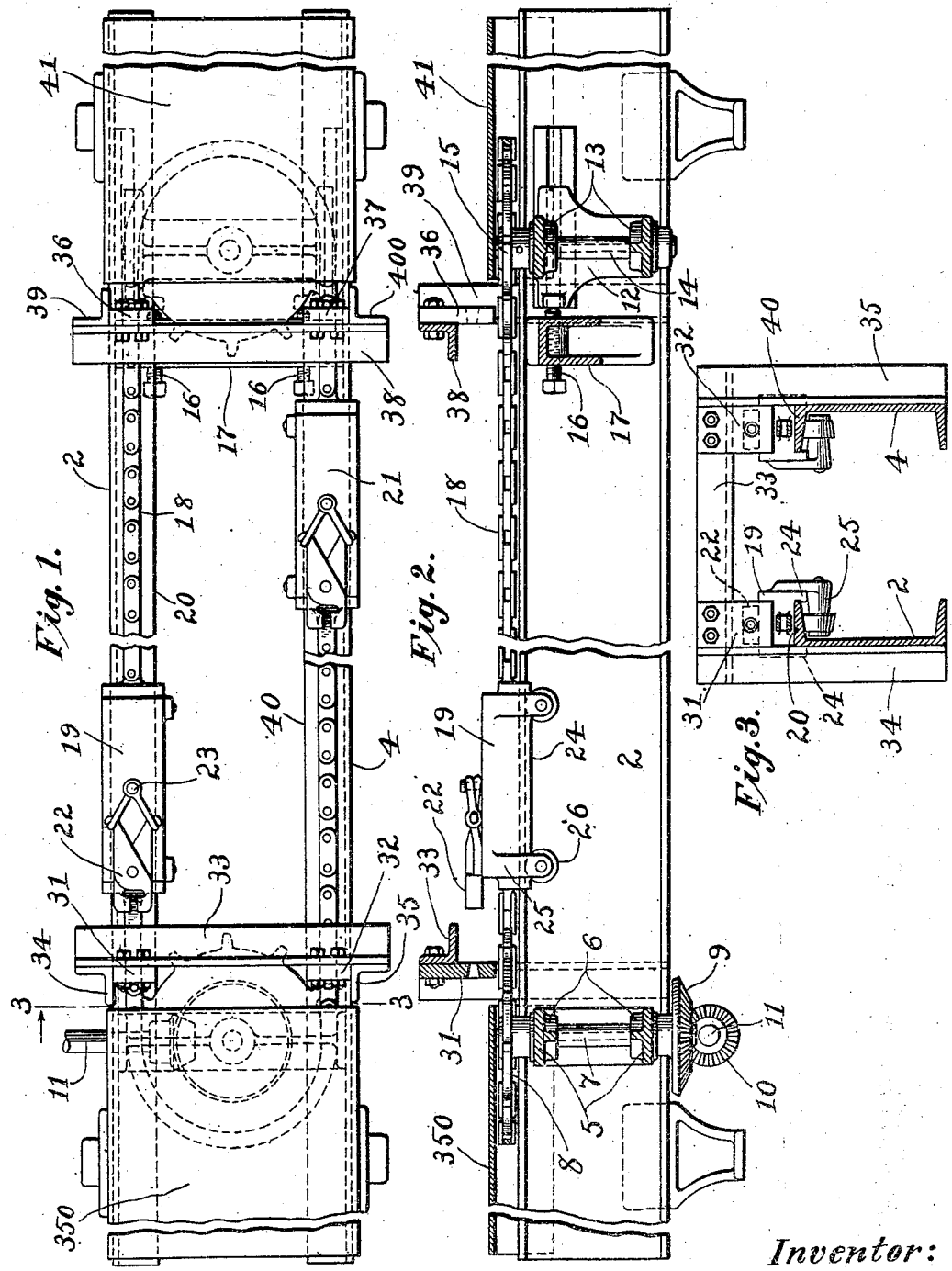

WILLIAM HADDOW, OF OSSINING, NEW YORK.

DRAW-BENCH.

1,057,730.  Specification of Letters Patent.  Patented Apr. 1, 1913.

Application filed July 18, 1912. Serial No. 710,209.

*To all whom it may concern:*

Be it known that I, WILLIAM HADDOW, a citizen of the United States, and a resident of Ossining, in the county of Westchester and State of New York, have invented certain new and useful Improvements in Draw-Benches, of which the following is a specification.

This invention relates to draw-benches and has for its object to provide a machine of the class specified of simple construction and large capacity in quantity of product.

I have illustrated my improved machine as particularly adapted for drawing tubes and have shown it in its preferred embodiment in the drawing accompanying this specification wherei :—

Figure 1 is a plan view and Fig. 2 is a sectional elevation thereof. Fig. 3 is a cross sectional elevation on line 3, 3 of Fig. 1.

My improved machine may be supported on some simple framing such as opposite channels 2, 4 set edgewise with their flanges inreaching toward one another. Near one end of said channels, cross member 5 is fixed and is provided with upper and lower bearings 6 midway of its length for rotatably supporting vertical shaft 7. To the upper end of this shaft is fixed sprocket 8 and to the lower end bevel gear 9. Said bevel gear is driven by bevel pinion 10 on the inner end of horizontal shaft 11, and which shaft is provided as driving means for said sprocket 8 and by which said sprocket may be driven in either direction. It will be understood that said shaft 11 in its turn may be driven from any suitable source of power not shown.

Near the opposite end of channels 2, 4 and adjustably supported for movement lengthwise of said channels is carriage 12 having upper and lower bearings 13 in which is rotatably mounted shaft 14 having sprocket 15 of the same size as sprocket 8 fixed thereto. Said carriage 12 may be adjusted relatively to cross member 5 by means of push screws 16 threaded through cross member 17 fixed to channels 2, 4. An endless power chain 18 is mounted on sprockets 8 and 15 and may be driven first in one direction and then in the other from shaft 11. Said sprockets 8 and 15 are so disposed relatively to the upper rails 20, 40 of channels 2, 4, respectively, as to cause chain 18 to travel in its lengthwise runs just above rails 20, 40.

Fixed to the lengthwise runs of chain 18 are opposite work-gripper carriages 19, 21. Each of said carriages is provided with a reversible work-gripper as 22 on carriage 19. Said work-gripper is of well-known form and may be reversed from end to end of said carriage about pivot 23. Each of said carriages as 19 may be provided with downwardly reaching flanges 24 overhanging upper rail as 20 of channel 2 and outwardly reaching from inner flange 24. Near either end of said carriage are arms as 25, bearing, pivotally mounted thereon, rolls as 26 for engagement with the underside of channel rail as 20. Said carriage is thereby retained in operative position on its rail while free to slide endwise thereon. For operating upon the tube I provide at one end of the machine adjacent to sprocket 8 opposite dies 31, 32 in line with the work-grippers on carriages 19, 21, respectively. Said dies may be supported in some convenient manner as by bolting to cross member 33 supported from opposite uprights 34, 35 fixed to channels 2, 4. Behind said dies, to the left, Figs. 1 and 2, I mount work table 350. Said table preferably extends over sprocket 8 forming a cover therefor and may be supported from channels 2, 4.

On the opposite end of the machine I provide a second pair of dies 36, 37 fixed to cross member 38 supported from uprights 39, 400 fixed to channels 2, 4, respectively. Back of said dies, to the right, Figs. 1 and 2, I mount a second work table 41. I thus provide a double-ended draw-bench having double dies at each end.

The operation of my improved machine is as follows: When operated as a single-ended double die bench the machine may be served by one operator. First inserting a tube end through die 31 into the jaws of work-gripper 22 the machine is then started with sprocket 8 rotating in clockwise direction whereby carriage 19 is moved down the machine to the right, Figs. 1 and 2. During this operation of drawing the first tube, carriage 21 travels backwardly to the left and at the time of the completion of the stroke of carriage 19 said carriage 21 is in receiving position relative to die 32. The machine being stopped in this position the tube whose drawing has been completed by carriage 19 is removed. A tube is then inserted through die 32 and its end presented